(12) United States Patent
Yonetani et al.

(10) Patent No.: US 12,228,517 B2
(45) Date of Patent: Feb. 18, 2025

(54) IDENTIFICATION APPARATUS

(71) Applicant: CANON KABUSHIKI KAISHA, Tokyo (JP)

(72) Inventors: Yuki Yonetani, Kanagawa (JP); Shigeru Ichihara, Tokyo (JP); Yasuhiro Sekine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 17/820,827

(22) Filed: Aug. 18, 2022

(65) Prior Publication Data

US 2022/0397532 A1 Dec. 15, 2022

Related U.S. Application Data

(63) Continuation of application No. PCT/JP2021/006638, filed on Feb. 22, 2021.

(30) Foreign Application Priority Data

Feb. 28, 2020 (JP) .................................. 2020-034061
Feb. 9, 2021 (JP) .................................. 2021-019103

(51) Int. Cl.
*G01N 21/65* (2006.01)
*G01B 11/30* (2006.01)
*G01J 3/44* (2006.01)

(52) U.S. Cl.
CPC ........... *G01N 21/65* (2013.01); *G01B 11/303* (2013.01); *G01J 3/44* (2013.01)

(58) Field of Classification Search
CPC .. G01N 21/65; G01N 21/6428; G01N 21/658; G01N 21/253; G01N 21/31;
(Continued)

(56) References Cited

U.S. PATENT DOCUMENTS

2015/0170337 A1 6/2015 Peng
2017/0235471 A1* 8/2017 Schøler ................... G01F 1/666
715/772
2018/0000011 A1* 1/2018 Schleusner ............. G01S 13/87

FOREIGN PATENT DOCUMENTS

EP 3176538 A1 * 6/2017 ......... G01B 11/0608
GB 2554467 A * 4/2018 ............... B07C 5/02
(Continued)

OTHER PUBLICATIONS

Akihiro Tsuchida, et al.; "Identification and Degradation Estimation of Waste Plastics for Recycling Using Raman Spectroscopy;" Bunseki Kagaku vol. 61, No. 12, pp. 1027-1032 (2012); The Japan Society for Analytical Chemistry; pp. 1-18.

*Primary Examiner* — Michael P Stafira
(74) *Attorney, Agent, or Firm* — CANON U.S.A., INC. IP DIVISION (57) ABSTRACT

An identification apparatus includes a plurality of light collection optical systems configured to collect scattered light from a plurality of test substances, a spectroscopic element configured to disperse a plurality of light beams from the plurality of light collection optical systems, an imaging unit including a plurality of light receiving elements arrayed in a row direction and a column direction, and configured to receive a plurality of dispersion spectra projected from the spectroscopic element and projected in the row direction, an acquisition unit configured to acquire spectroscopic information of at least any of the plurality of test substances based on an output signal from the imaging unit, and an intensification processing unit configured to perform row direction binning processing including integrating output signals of the plurality of light receiving elements existing at different positions in the row direction.

28 Claims, 6 Drawing Sheets

(58) Field of Classification Search
CPC .............. G01N 21/6452; G01N 21/359; G01N 21/6486; G01N 21/3504; G01N 21/6458; G01N 2800/52; G01N 21/6456; G01N 21/648; G01N 2021/6439; G01N 2201/0221; G01N 21/39; G01N 2201/08; G01N 33/15; G01N 2201/062; G01N 2201/06113; G01N 33/02; G01N 2201/061; G01N 21/35; G01N 21/3563; G01N 21/553; G01N 21/88; G01N 33/442; G01N 33/54373; G01N 33/582; G01N 21/554; G01N 2201/129; G01N 33/54366; G01N 2201/12; G01N 33/49; G01N 2021/3595; G01N 21/49; G01N 2021/399; G01N 21/85; G01N 21/25; G01N 21/55; G01N 21/59; G01N 21/9508; G01N 33/025; G01N 15/1459; G01N 21/64; G01N 21/255; G01N 21/6454; G01N 21/7703; G01N 21/274; G01N 21/4795; G01N 2201/1296; G01N 33/54313; G01N 2021/3513; G01N 2021/6417; G01N 33/57434; G01N 2021/1793; G01N 2021/3144; G01N 2021/656; G01N 2201/0612; G01N 30/466; G01N 15/14; G01N 2015/1493; G01N 2021/651; G01N 2223/419; G01N 2223/505; G01N 23/046; G01N 2500/00; G01N 33/54353; G01N 15/1468; G01N 2021/3531; G01N 21/645; G01N 21/78; G01N 33/0098; G01N 33/543; G01N 1/06; G01N 1/286; G01N 1/312; G01N 1/36; G01N 15/1425; G01N 2001/2873; G01N 2021/4797; G01N 2021/6463; G01N 2035/00039; G01N 2035/00138; G01N 2035/00752; G01N 2035/00861; G01N 2035/00881; G01N 21/47; G01N 21/552; G01N 21/718; G01N 30/6091; G01N 33/54388; G01N 35/00603; G01N 35/00613; G01N 35/00732; G01N 2015/0038; G01N 2015/1006; G01N 21/9501; G01N 2201/0627; G01N 33/5008; G01N 33/502; G01N 33/574; G01N 33/585; G01N 2021/4711; G01N 21/8851; G01N 2201/0214; G01N 2201/0216; G01N 2201/0691; G01N 2333/00; G01N 27/44721; G01N 33/569; G01N 33/57415; G01N 2021/6482; G01N 21/211; G01N 33/52; G01N 33/6893; G01N 1/38; G01N 15/1433; G01N 2001/383; G01N 2030/8417; G01N 21/27; G01N 2223/108; G01N 23/2255; G01N 2333/75; G01N 2333/775; G01N 2333/91188; G01N 2333/9123; G01N 2800/26; G01N 2800/40; G01N 30/6095; G01N 30/82; G01N 33/5079; G01N 33/54389; G01N 33/548; G01N 2021/0346; G01N 2021/6421; G01N 2021/6441; G01N 2021/7786; G01N 21/6408; G01N 2201/0833; G01N 33/5076; G01N 33/6803; G01N 15/149; G01N 2013/006; G01N 2015/1497; G01N 2021/7793; G01N 21/21; G01N 21/23; G01N 21/3577; G01N 21/80; G01N 21/95607; G01N 2201/0675; G01N 25/04; G01N 33/48; G01N 33/5014; G01N 33/6845; G01N 35/028; G01N 5/045; G01N 15/1434; G01N 2015/1486; G01N 2021/6423; G01N 21/7743; G01N 2201/0697; G01N 33/5091; G01N 33/542; G01N 33/56911; G01N 2021/3155; G01N 2021/655; G01N 2021/845; G01N 21/00; G01N 21/05; G01N 21/474; G01N 21/4788; G01N 2201/0636; G01N 15/1484; G01N 2015/144; G01N 2021/1731; G01N 2021/3129; G01N 2021/6484; G01N 21/33; G01N 21/6445; G01N 21/87; G01N 2201/0633; G01N 2201/12753; G01N 2333/40; G01N 2469/10; G01N 27/26; G01N 33/5302; G01N 33/56961; G01N 33/58; G01N 33/6896; G01N 15/1436; G01N 2021/393; G01N 2021/653; G01N 21/01; G01N 21/0303; G01N 21/3581; G01N 21/4738; G01N 2201/0683; G01N 2201/127; G01N 33/5308; G01N 33/553; G01N 33/57407; G01N 33/68; G01N 15/1429; G01N 15/147; G01N 2021/6471; G01N 2021/8887; G01N 21/03; G01N 21/8422; G01N 21/8806; G01N 2201/06106; G01N 2201/068; G01N 2201/088; G01N 2333/70596; G01N 2458/00; G01N 2500/04; G01N 27/447; G01N 27/44782; G01N 2800/2821; G01N 31/22; G01N 33/0044; G01N 33/5023; G01N 33/6818; G01N 33/6824; G01N 1/28; G01N 15/1404; G01N 2021/1765; G01N 2021/213; G01N 2021/6419; G01N 2021/7766; G01N 2021/7773; G01N 2021/7783; G01N 21/17; G01N 21/61; G01N 21/75; G01N 21/774; G01N 2610/00; G01N 30/74; G01N 30/95; G01N 33/4833; G01N 33/48721; G01N 33/5038; G01N 33/5058; G01N 33/5064; G01N 33/5073; G01N 33/53; G01N 33/54306; G01N 33/54346; G01N 33/551; G01N 33/557; G01N 33/56988; G01N 33/581; G01N 33/6821; G01N 35/00; G01N 35/00069; G01N 35/1074; G01N 15/0205; G01N 2015/016; G01N 2015/1447; G01N 2015/1472; G01N 2021/0112; G01N 2021/058; G01N 2021/3568; G01N 21/13; G01N 21/171; G01N 21/41; G01N 21/6402; G01N 21/71; G01N 21/95; G01N 2201/0231; G01N 2201/10; G01N 2201/1042; G01N 2291/0427; G01N 2333/212; G01N 2333/285; G01N 2333/31; G01N 2333/315; G01N 2333/445; G01N 2333/57; G01N 2333/90209; G01N 27/305; G01N 2800/14; G01N 2800/50; G01N 2800/54; G01N 29/46; G01N 33/483; G01N 33/487; G01N 33/50; G01N 33/5011; G01N 33/571; G01N 33/57484; G01N 33/66; G01N 33/6827; G01N 33/6842; G01N 33/6854; G01N 9/002; G01N 15/00; G01N 15/01; G01N 2015/0046; G01N 2015/03; G01N 2021/0118; G01N 2021/1714; G01N 2021/1757; G01N 2021/1776; G01N 2021/178; G01N 2021/3196; G01N
2021/335; G01N 2021/4714; G01N
2021/4742; G01N 2021/6491; G01N
2021/7779; G01N 21/07; G01N 21/19;
G01N 21/251; G01N 21/272; G01N
21/314; G01N 21/3151; G01N 21/3554;
G01N 21/45; G01N 21/532; G01N 21/73;
G01N 21/76; G01N 21/94; G01N
2201/0846; G01N 2201/1053; G01N
2291/02458; G01N 2291/02466; G01N
2291/02836; G01N 2333/23; G01N
2333/705; G01N 2333/942; G01N
24/088; G01N 2400/10; G01N 25/72;
G01N 2500/10; G01N 2800/56; G01N
29/14; G01N 33/0031; G01N 33/0047;
G01N 33/14; G01N 33/54386; G01N
33/54393; G01N 33/56905; G01N
33/56966; G01N 33/56983; G01N
33/57426; G01N 1/00; G01N 1/2214;
G01N 1/2226; G01N 15/0211; G01N
15/0606; G01N 15/10; G01N 2001/4088;
G01N 2015/011; G01N 2015/1029; G01N
2015/103; G01N 2015/1402; G01N
2015/142; G01N 2015/1438; G01N
2015/1443; G01N 2015/1454; G01N
2015/1477; G01N 2021/0137; G01N
2021/0181; G01N 2021/0193; G01N
2021/1725; G01N 2021/1782; G01N
2021/1789; G01N 2021/216; G01N
2021/258; G01N 2021/3125; G01N
2021/4166; G01N 2021/4173; G01N
2021/458; G01N 2021/4709; G01N
2021/551; G01N 2021/6432; G01N
2021/7736; G01N 2021/7769; G01N
2021/7776; G01N 2021/8444; G01N
2021/8825; G01N 2021/8883; G01N
2021/9511; G01N 2021/95676; G01N
2027/222; G01N 2035/00326; G01N
2035/00356; G01N 2035/0413; G01N
2035/0415; G01N 2035/0437; G01N
2035/1051; G01N 21/0332; G01N 21/15;
G01N 21/1717; G01N 21/4785; G01N
21/53; G01N 21/6447; G01N 21/66;
G01N 21/68; G01N 21/783; G01N 21/84;
G01N 21/9505; G01N 21/956; G01N
21/95692; G01N 2201/025; G01N
2201/0625; G01N 2201/0626; G01N
2201/0628; G01N 2201/063; G01N
2201/0634; G01N 2201/0635; G01N
2201/067; G01N 2201/103; G01N
2201/11; G01N 2201/117; G01N
2201/122; G01N 2201/125; G01N
2223/345; G01N 2223/6462; G01N
23/04; G01N 2333/42; G01N 2333/924;
G01N 2333/96433; G01N 2333/96466;
G01N 2333/974; G01N 2510/00; G01N
27/02; G01N 27/129; G01N 27/221;
G01N 27/44717; G01N 27/44726; G01N
27/44752; G01N 31/223; G01N 33/0034;
G01N 33/0057; G01N 33/12; G01N
33/4836; G01N 33/48735; G01N 33/492;
G01N 33/5029; G01N 33/532; G01N
33/533; G01N 33/5432; G01N 33/544;
G01N 33/552; G01N 33/57492; G01N
33/586; G01N 33/587; G01N 33/588;
G01N 33/6875; G01N 35/0098; G01N
35/026; G01N 35/1004; G01N 35/1009;
G01N 35/1065; G01N 35/1072; G01N
2021/8592; G01N 33/44; G01N
2021/4735; G01N 21/4133; G01N
21/5907; G01N 2015/1028; G01N
2201/121; G01N 2021/8455; G01N
2021/0389; G01N 2201/1293; G01B
11/2513; G01B 11/25; G01B 11/0608;
G01B 11/22; G01B 11/24; G01B 7/14;
G01B 11/026; G01B 11/00; G01B
9/02091; G01B 11/306; G01B 2290/70;
G01B 11/02; G01B 11/2509; G01B 9/04;
G01B 11/272; G01B 9/02087; G01B
11/0666; G01B 11/0675; G01B 2290/30;
G01B 2290/35; G01B 9/02; G01B
9/02004; G01B 9/02007; G01B 9/02019;
G01B 9/02022; G01B 9/02027; G01B
9/0203; G01B 9/02042; G01B 9/02049;
G01B 9/02069; G01B 9/02079; G01B
9/02084; G01B 9/0209; G01B 7/31;
G01B 9/02043; G01B 11/303; G01J
3/2823; G01J 3/2803; G01J 2003/2826;
G01J 3/0229; G01J 3/10; G01J 3/0208;
G01J 3/02; G01J 3/42; G01J 3/0218;
G01J 3/28; G01J 3/021; G01J 3/36; G01J
3/44; G01J 2003/1213; G01J 3/0256;
G01J 3/108; G01J 3/26; G01J 3/18; G01J
2003/104; G01J 3/14; G01J 3/0205; G01J
3/0264; G01J 3/32; G01J 3/1838; G01J
3/0232; G01J 3/0224; G01J 3/453; G01J
2003/2806; G01J 2005/0077; G01J
3/4406; G01J 3/027; G01J 3/12; G01J
3/06; G01J 2003/1208; G01J 3/0216;
G01J 3/0294; G01J 3/2846; G01J 5/0014;
G01J 2003/1217; G01J 2003/1282; G01J
3/2889; G01J 2003/2813; G01J 3/1895;
G01J 5/0804; G01J 2003/1278; G01J
3/0259; G01J 3/0289; G01J 3/443; G01J
2003/064; G01J 2003/423; G01J 3/0245;
G01J 3/433; G01J 5/20; G01J 3/0291;
G01J 2003/1226; G01J 3/0286; G01J
5/0802; G01J 5/0806; G01J 2003/1221;
G01J 3/0278; G01J 2003/123; G01J
3/0297; G01J 1/4228; G01J 2003/106;
G01J 2003/4424; G01J 3/08; G01J 5/53;
G01J 3/0237; G01J 3/0262; G01J 3/24;
G01J 3/457; G01J 3/51; G01J 5/80; G01J
2003/283; G01J 2003/2866; G01J
2003/516; G01J 3/427; G01J 3/4412;
G01J 5/02; G01J 5/026; G01J 5/0896;
G01J 5/602; G01J 1/0411; G01J 1/0422;
G01J 1/0425; G01J 1/0488; G01J 1/42;
G01J 1/44; G01J 2001/4242; G01J
3/0213; G01J 3/513; G01J 2003/2869;
G01J 2003/4332; G01J 2003/4334; G01J
3/04; G01J 3/465; G01J 1/0414; G01J
1/429; G01J 2003/1239; G01J 2003/1243;
G01J 2003/1247; G01J 2003/1286; G01J
2003/467; G01J 2005/604; G01J 3/0221;
G01J 3/024; G01J 3/0248; G01J 3/0272;
G01J 3/447; G01J 3/4531; G01J 3/462;
G01J 4/00; G01J 5/022; G01J 5/047;
G01J 5/061; G01J 5/07; G01J 5/08; G01J
5/08021; G01J 5/0808; G01J 5/0837;

G01J 5/0853; G01J 5/10; G01J 1/00;
G01J 2001/4247; G01J 2003/1204; G01J
2003/425; G01J 3/00; G01J 3/0202; G01J
3/0235; G01J 3/46; G01J 3/463; G01J
3/50; G01J 3/502; G01J 5/0066; G01J
5/0846; G01J 9/00; G01J 1/0204; G01J
1/0437; G01J 1/08; G01J 2001/442; G01J
2001/4453; G01J 2001/4466; G01J
2003/102; G01J 2003/1861; G01J
2003/2836; G01J 2003/421; G01J 3/0227;
G01J 3/0275; G01J 3/1256; G01J 3/1804;
G01J 3/40; G01J 3/45; G01J 3/4535;
G01J 3/501; G01J 3/522; G01J 3/524;
G01J 5/00; G01J 5/0003; G01J 5/0878;
G01J 5/60; G01J 2003/285

See application file for complete search history.

(56) References Cited

FOREIGN PATENT DOCUMENTS

| | | | | |
|---|---|---|---|---|
| JP | 2009216531 | A | | 9/2009 |
| JP | 2013127422 | A | | 6/2013 |
| JP | 2017003533 | A * | 1/2017 | |
| JP | 2019105628 | A * | 6/2019 | ............ B07C 5/368 |
| JP | 2019520574 | A | | 7/2019 |
| WO | 2017073737 | A1 | | 5/2017 |
| WO | WO-2019111785 | A1 * | 6/2019 | ............ B07C 5/368 |

* cited by examiner

IDENTIFICATION APPARATUS

CROSS-REFERENCE TO RELATED APPLICATIONS

This application is a Continuation of International Patent Application No. PCT/JP2021/006638, filed Feb. 22, 2021, which claims the benefit of Japanese Patent Applications No. 2020-034061, filed Feb. 28, 2020, and No. 2021-019103, filed Feb. 9, 2021, all of which are hereby incorporated by reference herein in their entirety.

BACKGROUND

Technical Field

The aspect of the embodiments relates to an identification apparatus that identifies properties such as a composition and an ingredient of a test substance based on scattered light from the test substance.

Background Art

There has been known an identification apparatus that optically identifies properties of a test substance using spectrographic analysis. By being arranged on a conveyance path on which a plurality of test substances is conveyed, the identification apparatus is used for inspection of manufactured products, sorting of waste substances, and the like.

Since the spectrographic analysis does not always require a vacuumization/decompression process, an atmosphere control process, a liquid immersion treatment process, or an atmosphere management process related to a drying process, which limits throughput, and can identify properties of a test substance under air atmosphere, recently, the spectrographic analysis has been tried to be applied to the sorting of waste plastics.

Commonly-known types of the spectrographic analysis include an infrared absorption spectroscopy that acquires an absorbance spectrum of a test substance with respect to incident light including light in an infrared wavelength range, and a Raman scattering spectroscopy that acquires a scatter spectrum of a test substance with respect to incident light including light in an ultraviolet wavelength range. Since the Raman scattering spectroscopy is less susceptible to light attenuation caused by the thickness of a sample, the Raman scattering spectroscopy is used for identification of waste substances including test substances that vary in size.

BUNSEKI KAGAKU Vol. 61, No. 12, pp. 1027-1032 (2012) discusses an identification apparatus of waste plastics that includes a plurality of sets each including a light collection optical system, a spectroscopic element, and a two-dimensional imaging unit. BUNSEKI KAGAKU Vol. 61, No. 12, pp. 1027-1032 (2012) further discusses that the identification apparatus performs electronic intensification processing of intensifying output signals of Raman-scattered light by performing binning processing on light receiving elements arrayed in a column direction intersecting a spectrum, among light receiving elements onto which a spectrum image is projected.

Japanese Patent Application Laid-Open No. 2019-105628 discusses an identification apparatus including a plurality of light collection optical systems, a spectroscopic element, and a two-dimensional imaging unit. Japanese Patent Application Laid-Open No. 2019-105628 discusses downsizing of the identification apparatus through consolidation of devices subsequent to the plurality of light collection optical systems into one spectroscopic element and one two-dimensional imaging unit. Japanese Patent Application Laid-Open No. 2019-105628 also discusses speeding up of identification processing by the identification apparatus including a rolling shutter type complementary metal-oxide semiconductor (CMOS) image sensor as the two-dimensional imaging unit.

CITATION LIST

Patent Literature

PTL 1: Japanese Patent Application Laid-Open No. 2019-105628

Non Patent Literature

NPL 1: BUNSEKI KAGAKU Vol. 61, No. 12, pp. 1027-1032 (2012)

In the identification apparatus discussed in Japanese Patent Application Laid-Open No. 2019-105628, an effective sensitivity of an optical system to be detected is restricted by a sensitivity characteristic of an image sensor, and an amount of light to be emitted to a unit image sensor. The identification apparatus discussed in BUNSEKI KAGAKU Vol. 61, No. 12, pp. 1027-1032 (2012) can adjust a resolution in a wavelength direction and the number of scanning lines of light receiving elements onto which one light collection channel is projected, by adjusting a projection distance from the spectroscopic element to the two-dimensional imaging unit. On the other hand, in the identification apparatus discussed in Japanese Patent Application Laid-Open No. 2019-105628, by increasing a projection distance, a light amount per light receiving element of a projected spectrum image decreases, and a signal-to-noise ratio (SNR) becomes insufficient in some cases.

Although the identification apparatus discussed in BUNSEKI KAGAKU Vol. 61, No. 12, pp. 1027-1032 (2012) performs the binning processing in a projection width direction of a spectrum image, intensification is insufficient, and an SNR with respect to weak scattered light in a high frequency range becomes insufficient. Thus, there has been concern that throughput of identification may be limited.

SUMMARY

The aspect of the embodiments is directed to providing a high-sensitive identification apparatus including an imaging unit that does not excessively restrict a signal-to-noise ratio of an output signal corresponding to a projected spectrum image.

According to an aspect of the embodiments, an identification apparatus includes a plurality of light collection optical systems configured to collect scattered light from a plurality of test substances, a spectroscopic element configured to disperse a plurality of light beams from the plurality of light collection optical systems, an imaging unit including a plurality of light receiving elements arrayed in a row direction and a column direction, and configured to receive a plurality of dispersion spectra projected from the spectroscopic element and projected in the row direction, an acquisition unit configured to acquire spectroscopic information of at least any of the plurality of test substances based on an output signal from the imaging unit, and an intensification processing unit configured to perform row direction binning processing including integrating output signals of the plurality of light receiving elements existing at different positions in the row direction.

Further features of the disclosure will become apparent from the following description of exemplary embodiments with reference to the attached drawings.

DESCRIPTION OF THE EMBODIMENTS

Hereinafter, exemplary embodiments of the disclosure will be described with reference to the drawings.

Hereinafter, modes for carrying out the aspect of the embodiments will be described with reference to the drawings. The following exemplary embodiments appropriately modified or improved based on the common knowledge of one skilled in the art without departing from the spirit of the disclosure are also interpreted as falling within the scope of the disclosure.

Figure 1A:
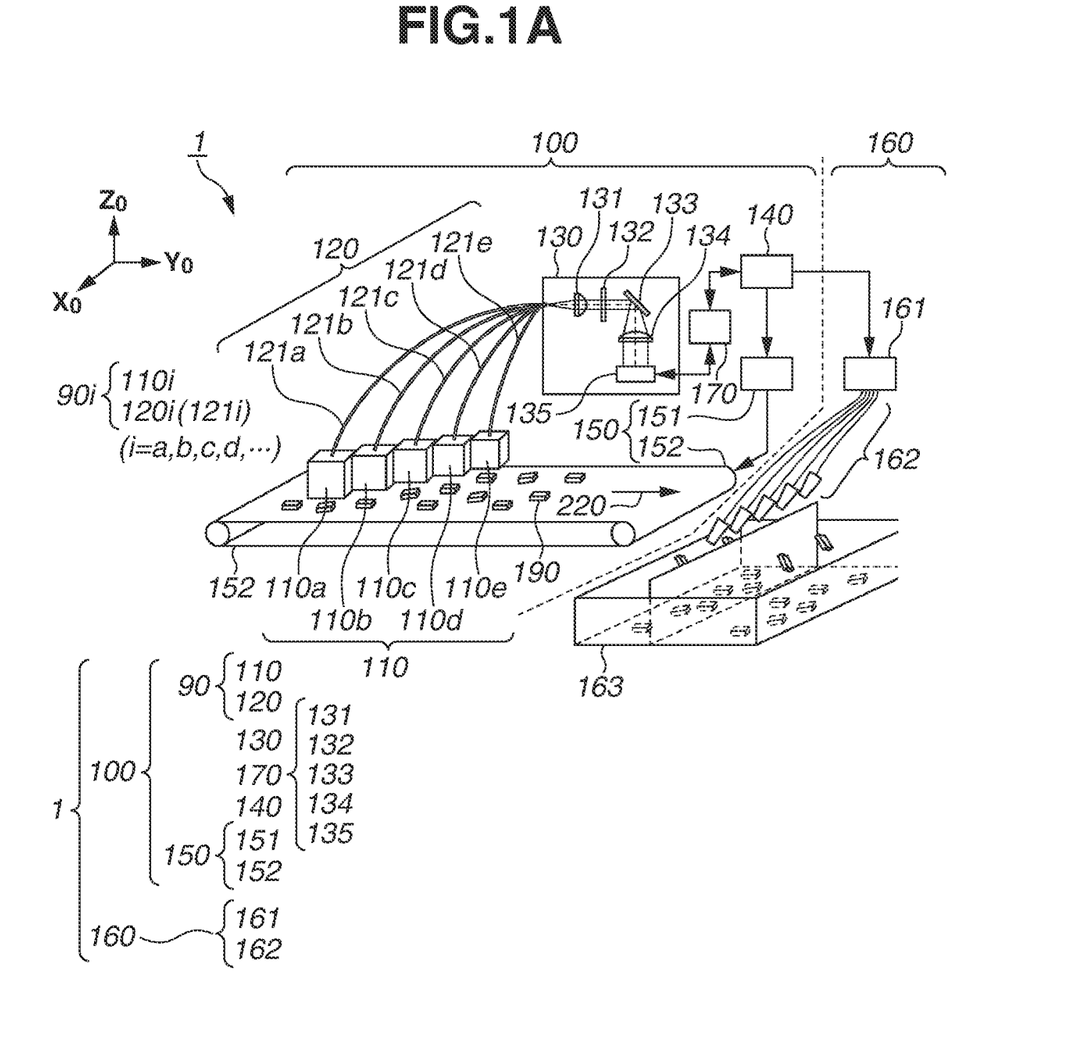
FIG. 1A is a schematic configuration diagram of an identification apparatus according to a first exemplary embodiment.

An identification apparatus 1 according to a first exemplary embodiment of the disclosure will be described with reference to FIGS. 1A, 1B, 1C, and 2. FIG. 1A is a diagram schematically illustrating a configuration of the identification apparatus 1 according to the first exemplary embodiment.

As illustrated in FIG. 1A, the identification apparatus 1 includes a plurality of light collection optical systems 90$i$ that collects scattered light from a plurality of test substances 190 (190$i$, i=a, b, c, and so on), and a spectroscopic element 133 that disperses a plurality of light beams from the plurality of light collection optical systems 90$i$. The identification apparatus 1 further includes an imaging unit 135 including a plurality of light receiving elements 135$j$ arrayed in a row direction 135$r$ and a column direction 135$c$, onto which a plurality of dispersion spectra 300 from the spectroscopic element 133 is projected in the row direction 135$r$. The identification apparatus 1 further includes an acquisition unit 140 that acquires spectroscopic information of any of the plurality of test substances 190 based on an output signal from the imaging unit 135, and an intensification processing unit 170. The intensification processing unit 170 is a characteristic configuration of the aspect of the embodiments, and performs row direction binning processing including integrating output signals of the plurality of light receiving elements 135$j$ existing at different positions in the row direction 135$r$.

As illustrated in FIG. 1A, the identification apparatus 1 includes an identification unit 100 that optically identifies the plurality of test substances 190 placed at predetermined positions, and a sorting unit 160 that sorts the plurality of test substances 190 based on identification information from the identification unit 100. The identification unit 100 includes a placement unit 150 on which the plurality of test substances 190 is placed at the predetermined positions, and the light collection optical system 90$i$ that collects scattered light from the placed test substance 190$i$. The identification unit 100 further includes a spectroscopic imaging unit 130 including the spectroscopic element 133 and the imaging unit 135 for acquiring spectrum images 300$i$ of collected light, the acquisition unit 140 that acquires spectroscopic information of the test substances 190 from the spectroscopic imaging unit 130, and the intensification processing unit 170. In the identification apparatus 1 according to the present exemplary embodiment, the intensification processing unit 170 is mounted between the imaging unit 135 and the acquisition unit 140 to pass an output signal from the imaging unit 135 to the acquisition unit 140 after performing intensification processing on the output signal. As a mounting configuration other than mounting the intensification processing unit 170 at a position between the imaging unit 135 and the acquisition unit 140, the intensification processing unit 170 may be mounted to be included in a signal output unit (not illustrated) included in the imaging unit 135, or may be mounted to be included in a signal input unit (not illustrated) included in the acquisition unit 140.

Placement Unit

The test substances 190 are moved in a state of being scattered on a belt conveyor 152 included in the placement unit 150 via a supply unit such as a vibration feeder. As illustrated in FIG. 1A, the placement unit 150 includes the belt conveyor 152 that conveys the plurality of test substances 190 in a predetermined direction 220, and a conveyance control unit 151 that controls the belt conveyor 152. The predetermined direction 220 may also be referred to as a conveyance direction 220. The placement unit 150 places the test substances 190$i$ in effective light collection regions of the light collection optical systems 90$i$, which will be described below. The test substances 190$i$ placed in the effective light collection regions are then moved by the placement unit 150 to the outside of the effective light collection region. In other words, the placement unit 150 including the belt conveyor 152 conveys the test substances 190$i$ from an upstream side to a downstream side of the effective light collection regions in the conveyance direction 220. The belt conveyor 152 may be replaced with a roller conveyor or a conveyance path that moves test substances in a predetermined direction by being vibrated by standing waves, or may have a combined configuration of these. The placement unit 150 includes a mechanism for moving the test substances 190i placed in the effective light collection regions to the outside of the effective light collection regions.

Sorting Unit

As illustrated in FIG. 1A, the sorting unit 160 performs a sorting operation of selectively storing the plurality of test substances 190 moved by the placement unit 150 into collecting compartments of a sorting basket 163 based on identification information from the identification unit 100. The sorting unit 160 includes an air gun 162 that discharges air at a predetermined timing in a sorted zone in which test substances 190 move in the air, an air gun control unit 161 that commands the air gun 162 to perform an air discharge operation, and the sorting basket 163. The identification apparatus 1 includes the sorting unit 160 that performs identification processing of identifying properties of the test substances 190 and sorts the test substances 190 based on an identification result. In other words, the sorting unit 160 may be sometimes referred to as a test substance sorting system.

Spectroscopic Imaging Unit

As illustrated in FIG. 1A, the identification apparatus 1 includes a light collection optical system 90 arranged at an epi-illumination position with respect to the placement unit 150 to use a Raman scattering spectroscopy as spectroscopic processing to be performed on secondary light scattered from the test substances 190. More specifically, the light collection optical system 90 according to the present exemplary embodiment includes an illuminating system (primary light) and a light collection system (secondary light) arranged on the same side with respect to the test substances 190 for collecting Raman-scattered light. In other words, the illuminating system (primary light) and the light collection system (secondary light) are arranged on the same side with respect to the placement unit 150. In a modified configuration of the present exemplary embodiment in which an identification apparatus uses an infrared spectroscopy, a light collection optical system has transmissive arrangement with respect to the placement unit 150. More specifically, in the configuration that uses the infrared spectroscopy, the illuminating system (primary light) and the light collection system (secondary light) are arranged on opposite sides with respect to the test substances 190.

Figure 1B:
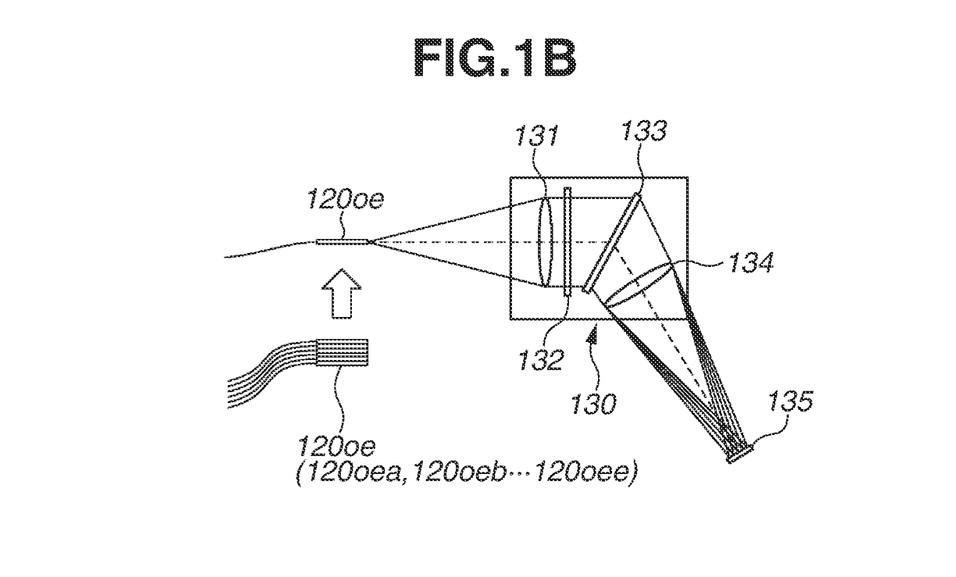
FIG. 1B is a schematic configuration diagram of a spectroscopic imaging system according to the first exemplary embodiment.

As illustrated in FIGS. 1A and 1B, the light collection optical system 90 is configured to collect Raman-scattered light from the test substances 190 and guide the collected light to the spectroscopic imaging unit 130. The light collection optical system 90 includes the plurality of light collection optical systems 90i arranged at different positions over a conveyance width of the belt conveyor 152 on which the test substances 190i are conveyed. The light collection optical systems 90i (i=a, b, c, . . . , and e) include light collection units 110i and light guiding units 120i (i=a, b, c, . . . , and e) to simultaneously collect Raman-scattered light from the test substances 190 discretely placed in a conveyance width direction of the belt conveyor 152. In other words, the light collection optical systems 90i (i=a, b, c, . . . , and e) include the light collection units 110i and the light guiding units 120i (i=a, b, c, . . . , and e) to collect, in parallel, Raman-scattered light from the test substances 190 discretely placed in the conveyance width direction of the belt conveyor 152.

The light guiding units 120i guide light collected from the respective light collection unit 110i to the spectroscopic element 133 included in the spectroscopic imaging unit 130. The plurality of light guiding units 120i (i=a, b, c, . . . , and e) respectively includes exit optical ends 120oei (i=a, b, c, . . . , and e) on the side of the spectroscopic element 133. The exit optical ends 120oei (i=a, b, c, . . . , and e) are bundled together in a state of being arranged in a line in a direction vertical to the drawing surface of FIG. 1B. A plurality of Raman-scattered light beams guided from the plurality of the light guiding units 120i (i=a, b, c, . . . , and e) enters the spectroscopic element 133 from the exit optical ends 120oei (i=a, b, c, . . . , and e) in a state of being arranged in a line in the direction vertical to the drawing surface of FIG. 1B. The plurality of Raman-scattered light beams is dispersed by the spectroscopic element 133 and projected in a direction vertical to the array direction of the exit optical ends 120oei (i=a, b, c, . . . , and e) of the light guiding units 120i (i=a, b, c, . . . , and e), i.e., projected in a direction parallel to the drawing surface of FIG. 1B.

The spectroscopic imaging unit 130 includes the spectroscopic element 133 that disperses Raman-scattered light collected by the light collection optical system 90, and the imaging unit 135 that receives Raman-scattered light dispersed by the spectroscopic element 133. The spectroscopic imaging unit 130 generates a spectrum signal by dispersing the Raman-scattered light. The spectroscopic imaging unit 130 includes an image forming lens 131, a long-pass filter 132, the spectroscopic element 133 such as a diffractive grating, an image forming lens 134, and the imaging unit 135.

The image forming lens 131 collimates light beams from optical fibers 121.

Figure 1C:
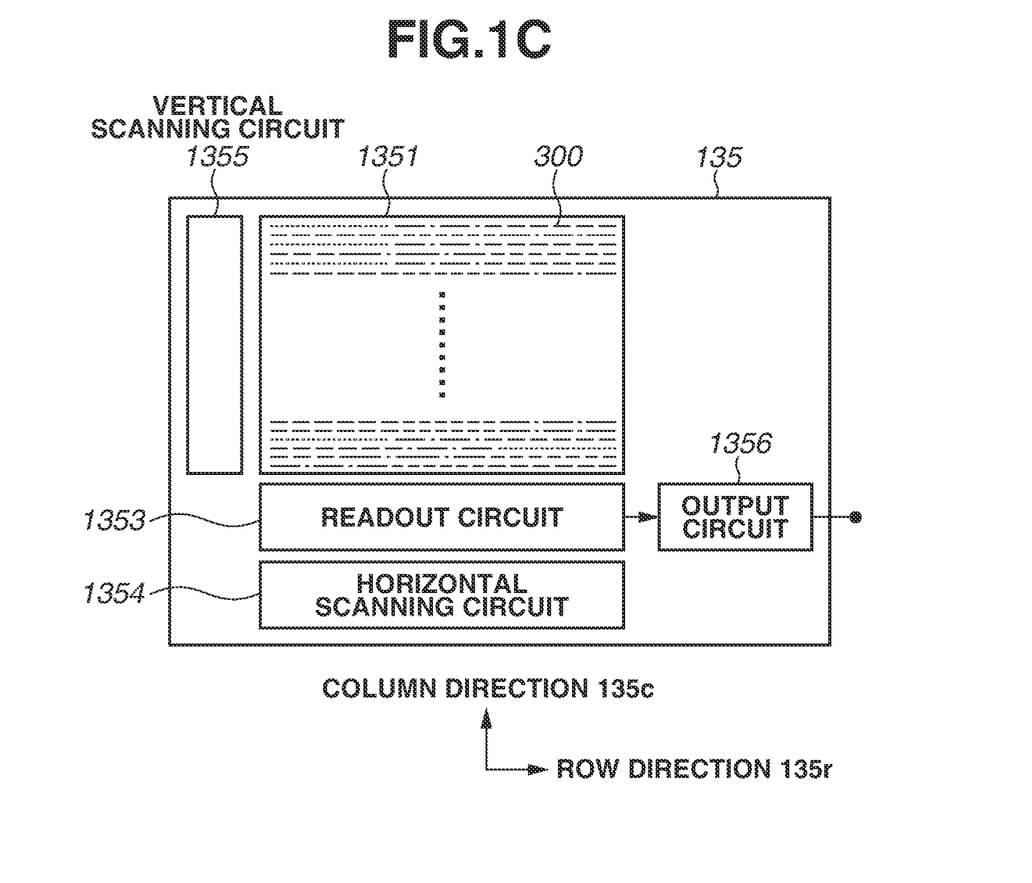
FIG. 1C is a schematic configuration diagram of an imaging unit according to the first exemplary embodiment.

The spectroscopic element 133 disperses Raman-scattered light collected by the light collection optical system 90, and one-dimensionally disperses the Raman-scattered light for each wavelength. The image forming lens 134 forms an image on the imaging unit 135 using light dispersed by the spectroscopic element 133. Linearly-arranged spectrum images are thereby projected onto a light receiving surface of the imaging unit 135 as illustrated in FIG. 1C. The optical arrangement and the spectroscopic method of the components of the spectroscopic imaging unit 130 may be appropriately changed to another generally-used configuration such as Rowland arrangement or a Czerny-Turner system.

The long-pass filter 132 is arranged between the image forming lens 131 and the spectroscopic element 133 to remove remaining excitation light components and let Raman-scattered light through.

Imaging Unit

A plurality of Raman-scattered light beams one-dimensionally dispersed by the spectroscopic element 133 is projected onto the imaging unit 135, and the imaging unit 135 converts the Raman-scattered light beams into electrical signals. The imaging unit 135 is an area image sensor in which pixels including a photoelectric conversion element are two-dimensionally arrayed in a direction parallel to the drawing surface of FIG. 1C. A plurality of spectrum images onto which Raman-scattered light beams guided and dispersed by the respective light guiding units 120i (i=a, b, c, . . . , and e) are projected is arranged on the light receiving surface of the imaging unit 135 in the column direction 135c in FIG. 1C. In addition, wavelength components of the respective spectrum images are projected in the row direction 135r on the light receiving surface of the imaging unit 135.

As illustrated in FIG. 1C, the imaging unit 135 includes a capturing region 1351 in which pixels including a photoelectric conversion element are arrayed in a matrix. By Raman-scattered light beams respectively being guided by the plurality of optical fibers 121 included in the light guiding unit 120 and dispersed by the spectroscopic element 133, images are formed on the light receiving surface of the imaging unit 135, and the plurality of dispersion spectra 300 is projected thereon. For the sake of explanatory convenience, the spectrum images are indicated by dotted lines to clearly indicate differences in light intensity among the dispersion spectra 300. The dispersion spectra 300 are converted by the imaging unit 135 into electrical signals, and output to the acquisition unit 140 as light intensity information of each wavelength, i.e., spectrum data. The acquisition unit 140 controls a sorting operation of the sorting unit 160 based on the spectroscopic information.

In other words, the capturing region 1351 defines an effective image capturing area of the imaging unit 135. The capturing region 1351 includes two-dimensionally arrayed pixels. A two-dimensional captured image can be obtained by combining main scanning and sub scanning. Herein, the sub scanning is conducted in a direction intersecting a direction of the main scanning, at a frequency lower than that of the main scanning. When the number of pixel rows included in the capturing region 1351 and to be subjected to the sub scanning is denoted by N, the main scanning is generally conducted at a frequency of N or more times of a sub scanning frequency.

The identification apparatus 1 identifies the types of test substances 190 while conveying the test substances 190 using the placement unit 150, and sorts the test substances 190 using the sorting unit 160, to be described below, based on the identification result. Thus, for increasing throughput of sorting processing to be executed by the sorting unit 160, it is desirable to increase a conveyance speed of the test substances 190 conveyed by the placement unit 150. The spectrum images projected onto the imaging unit 135 are formed by Raman-scattered light beams emitted from the test substances 190 moving on a conveyance surface of the placement unit 150. Thus, while the conveyed test substances 190 exist within a detectable region of the light collection optical system 90, the spectrum images are formed on the imaging unit 135. For example, in a case where the conveyance speed of the test substances 190 conveyed by the placement unit 150 is 2 m/second, and a size of each of the test substances 190 is 10 mm, a time during which the imaging unit 135 can detect a spectrum image formed with Raman-scattered light beams emitted from the test substance 190 becomes 5 milliseconds or less. Thus, the imaging unit 135 is demanded to have a high frame rate. An example of such an imaging unit having a high frame rate is a complementary metal-oxide semiconductor (CMOS) image sensor. Thus, a CMOS image sensor is desirably used as the imaging unit 135.

Since the intensity of Raman-scattered light beams emitted from the test substances 190 is extremely weak as described above, the intensity of light entering each pixel in the capturing region 1351 of the imaging unit 135 is extremely weak as well. Thus, it is desirable to use the imaging unit 135 having high sensitivity in a wavelength range in which the spectrum images 300$i$ are to be acquired. Generally, a rolling shutter type image sensor has a simpler pixel structure and a higher aperture ratio, and can include larger photoelectric conversion elements compared with a global shutter type image sensor. Thus, the sensitivity and the dynamic range of the rolling shutter type can be increased. In addition, since the pixel structure is simpler, the rolling shutter type image sensor is more advantageous than the global shutter type image sensor in terms of lowing costs. From these reasons, in the present exemplary embodiment, a rolling shutter type CMOS image sensor is used as the imaging unit 135.

The imaging unit 135 is desirably a rolling reset type image sensor that sequentially performs a reset operation for each pixel row. This can increase an exposure time of each pixel row as long as possible, and increase sensitivity.

The imaging unit 135 desirably includes a crop readout function of performing a readout operation on a specific pixel row in the capturing region 1351. With this configuration, for example, when another detection unit detects that the test substances 190 reach the detectable region of the light collection optical system 90, the readout operation can be performed on a pixel row corresponding to the light collection optical system 90.

The imaging unit 135 includes a readout circuit 1353, a horizontal scanning circuit 1354, a vertical scanning circuit 1355, and an output circuit 1356, and sequentially reads out signals from a plurality of pixels arranged in a matrix, row by row. The vertical scanning circuit 1355 selects and drives a pixel row in the capturing region 1351. The readout circuit 1353 reads signals output from pixels in the row selected by the vertical scanning circuit 1355, and transfers the signals to the output circuit 1356 in response to the control of the horizontal scanning circuit 1354. Accordingly, readout in a main scanning direction (row direction) is performed. Then, a row selected by the vertical scanning circuit 1355 is shifted, and the readout circuit 1353 performs readout in the main scanning direction in response to the control of the horizontal scanning circuit 1354. By repeating the processing, a selected pixel row is shifted in a sub scanning direction (column direction), and signals can be read from the entire capturing region 1351. The read signals are transmitted to the outside of the imaging unit 135 via the output circuit 1356. At this time, while scanning in the main scanning direction is performed at high speed, scanning in the sub scanning direction is performed at a slower speed than that of the scanning in the main scanning direction.

Light Collection Unit

Figure 2:
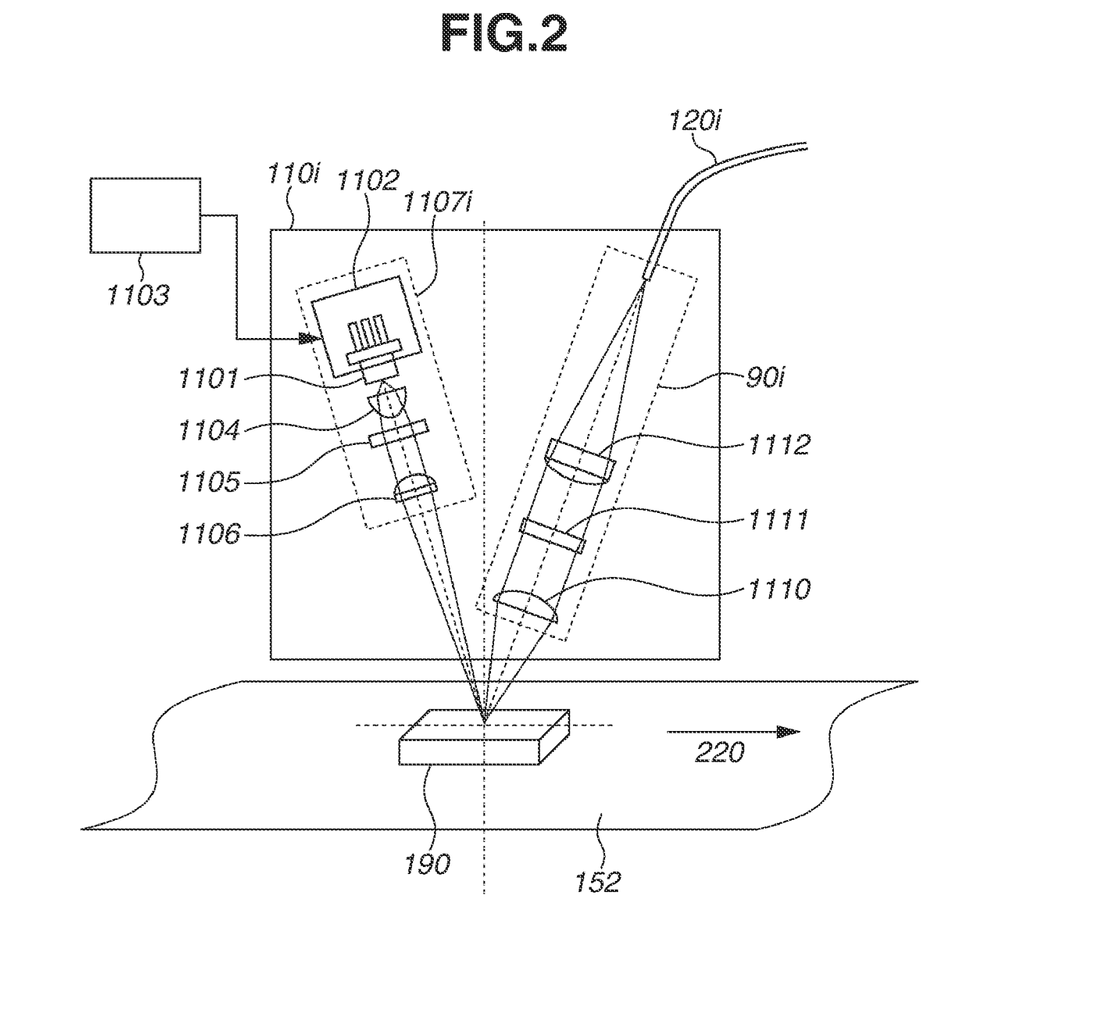
FIG. 2 is a diagram schematically illustrating an example of a configuration of a light collection unit.

The light collection unit 110$i$ of the present exemplary embodiment will be described in detail below with reference to FIG. 2. The light collection unit 110$i$ includes an illumination optical unit 1107$i$ that emits light to the test substance 190, and a light collection optical system 90$i$ that collects Raman-scattered light from the test substance 190.

The illumination optical unit 1107$i$ is an optical unit including an optical element that illuminates the test substance 190 on the conveyance surface of the belt conveyor 152 included in the placement unit 150, with light from a semiconductor laser 1101. The test substance 190 illuminated by the illumination optical unit 1107$i$ emits Raman-scattered light. At this time, the intensity of Raman-scattered light emitted from the test substance 190 is about $10^{-6}$ times the intensity of Rayleigh-scattered light that is elastically scattered on the surface of the test substance 190 and does not show a wavelength shift, and thus the intensity of Raman-scattered light is weak. As illustrated in FIG. 2, the illumination optical unit 1107$i$ includes the semiconductor laser 1101, a laser mount 1102, a laser driver 1103, a collimator lens 1104, a cylindrical lens 1105, and a condenser lens 1106. The semiconductor laser 1101 may also be referred to as a light source 1101.

The semiconductor laser 1101 is a light source of light that illuminates the test substances 190. In the present exemplary embodiment, the semiconductor laser 1101 is a continuous oscillation laser, and emits light with the intensity necessary for causing Raman-scattered light from the test substances 190. The occurrence efficiency of Raman scattering is higher as the wavelength of illumination light becomes shorter, and is lower as the wavelength of illumination light becomes longer. On the other hand, the intensity of fluorescence being a background noise of Raman-scattered light is lower as the wavelength of illumination light becomes longer, and is higher as the wavelength of illumination light becomes shorter. As light from the semiconductor laser 1101, for example, light in a wavelength of 532 nm, 633 nm, or 780 nm can be used. The description has been given of a case where the semiconductor laser 1101 is used as a light source of the illumination optical unit 1107*i*, but the light source is not limited thereto. Another laser light source such as a diode pumped solid state laser or a gas laser can also be used. The wavelength of a light source to be applied to the illumination optical unit 1107*i* is selected considering a Raman shift amount and a signal-to-noise ratio that are unique to a material to be identified.

The laser mount 1102 holds the semiconductor laser 1101 and releases heat. The laser driver 1103 supplies electric current to the semiconductor laser 1101 via the laser mount 1102, oscillates the semiconductor laser 1101, and at the same time, keeps the temperature of the semiconductor laser 1101 constant. The laser driver 1103 may be provided for each of the light collection optical systems 90*i*, or one laser driver 1103 may be provided for the plurality of light collection optical systems 90*i*.

The collimator lens 1104 and the cylindrical lens 1105 restrict spreading of outgoing light beams of the semiconductor laser 1101, and form the outgoing light beams into parallel light beams. The cylindrical lens 1105 may use another collimating optical element such as an anamorphic prism pair. In the illumination optical unit 1107*i*, a wavelength filter (not illustrated) including a laser line filter can be arranged. The wavelength filter can be arranged at a position on a pupil surface of the illumination optical unit 1107*i*. With this configuration, a wavelength characteristic of light emitted to the test substance 190 by the illumination optical unit 1107*i* can be improved. The condenser lens 1106 condenses light from the semiconductor laser 1101 on the test substance 190. As the collimator lens 1104, the cylindrical lens 1105, and the condenser lens 1106, it is desirable to use lenses formed of synthetic quartz. Because high-intensity light from the semiconductor laser 1101 passes through these lenses, by using lenses formed of synthetic quartz, it is possible to reduce background fluorescence and Raman-scattered light derived from a minor component included in an observation system.

As long as Raman-scattered light with the intensity sufficient for identification can be obtained from the test substance 190, the condenser lens 1106 is not always essential. More specifically, the illumination optical unit 1107*i* may be configured to emit light beams collimated by the collimator lens 1104 and/or the cylindrical lens 1105 directly to the test substance 190.

The light collection optical system 90*i* is an optical unit including an optical element that collects Raman-scattered light from the test substance 190 illuminated by the illumination optical unit 1107*i*. The Raman-scattered light collected by the light collection optical system 90*i* is guided to the spectroscopic element 133 by an optical fiber 121 serving as a light guiding unit. The light collection optical system 90*i* includes an objective lens 1110, an excitation light cut filter 1111, and a fiber condenser lens 1112.

The objective lens 1110 collects Raman-scattered light from the test substance 190 illuminated by the illumination optical unit 1107*i*. Since high-output light may be emitted depending on the test substance 190, each lens, such as the objective lens 1110, included in the light collection optical system 90*i* is desirably a quartz lens to reduce background fluorescence and Raman-scattered light derived from an observation system. Similarly, to prevent background noise due to balsam, or prevent balsam separation caused by heat generation, it is desirable not to use a cemented lens. In other words, each lens, such as the objective lens 1110, included in the light collection optical system 90*i* is desirably a single lens. To increase the coupling efficiency with respect to the optical fiber 121, which is a light guiding unit, the objective lens 1110 is desirably an aspheric lens.

The excitation light cut filter 1111 is a wavelength filter such as a band-pass filter or a long-pass filter, and blocks light in at least part of wavelength ranges of light collected by the objective lens 1110 while allowing Raman-scattered light to pass therethrough. With this configuration, light unnecessary for measuring Raman-scattered light is blocked while Raman-scattered light is transmitted. From the aspect of filter characteristics, the excitation light cut filter 1111 is desirably arranged in a parallel light flux between the objective lens 1110 and the fiber condenser lens 1112, i.e., arranged on the pupil surface of the light collection optical system 90*i*.

The fiber condenser lens 1112 couples Raman-scattered light into the optical fiber 121. In a case where the excitation light cut filter 1111 is inserted, Raman-scattered light from the fiber condenser lens 1112 is ignorable. Thus, it is desirable to reduce aberration using a cemented lens to prioritize the coupling efficiency into the optical fiber 121. The cemented lens includes a doublet lens.

In the present exemplary embodiment, the illumination optical unit 1107*i* and light collection optical units 1103*i* included in the light collection optical system 90*i* are independent components, but the configuration of the light collection optical system 90*i* is not limited thereto. More specifically, the illumination optical unit 1107*i* and the light collection optical units 1103*i* may share part of optical elements such as various lenses that are included in the respective optical systems.

It is desirable that the plurality of light collection optical systems 90*i* be arranged at different positions in the conveyance direction 220 of the placement unit 150. Each of the light collection optical systems 90*i* is large to some extent since the light collection optical system 90*i* includes the illumination optical unit 1107*i* and the light collection optical units 1103*i*. In view of the foregoing, the plurality of light collection optical systems 90*i* is obliquely arrayed when viewed from a direction vertical to the conveyance surface of the placement unit 150 so that it is possible to increase the arrangement density of the light collection optical systems 90*i* in the width direction of the placement unit 150. With this configuration, it is possible to increase the resolution of identification performed by the identification apparatus 1, and it becomes possible to identify the test substances 190 with smaller sizes.

FIG. 1C is a diagram illustrating a projected state of the image capturing region 1351 of the imaging unit 135 onto which the plurality of dispersion spectra 300 is projected. In the image capturing region 1351, the dispersion spectra 300 corresponding to the respective fiber positions of the exit optical ends 120*oei* (i=a, b, c, . . . , and e) of the light guiding units 120*i* are projected. The dispersion spectrum 300 is converted by the imaging unit 135 into an electrical signal and output to the acquisition unit 140 via the intensification processing unit 170 as a Raman spectrum, which is light intensity information for each wavelength.

At this time, wavelength resolution of the spectroscopic imaging unit 130 is restricted by a fiber core diameter of a light guiding unit 120*i* and optical performance of the spectroscopic element 133. Thus, it is considered that the imaging unit 135 needs not always have a wavelength resolution larger than or equal to the wavelength resolution of the spectroscopic imaging unit 130. More specifically, even if an element size (element pitch) of light receiving elements arrayed in the row direction 135*r* being a projected spectrum direction is made smaller than a projected beam diameter corresponding to monochromatic light, as a projection condition, an effective wavelength resolution peaks out, and thus the imaging unit 135 is overengineered. Test substances showing dark color or black color and emitting weak Raman-scattered light are demanded to be intensified rather than to have higher resolution in the wavelength direction. The test substances showing dark color or black color and emitting weak Raman-scattered light contain polypropylene.

The intensification processing unit 170 according to the present exemplary embodiment reduces noise by integrating detection signals corresponding to light receiving elements in a dispersing direction of the imaging unit 135 by binning processing, intensifies a signal amount, and increases detection sensitivity. Because detection signals are intensified by integration while thermal noise included in detection signals of a plurality of light receiving elements has low correlation between the light receiving elements, the binning processing in the wavelength direction can bring about an effect of intensifying detection signal intensity while increasing an effective signal-to-noise ratio.

The binning processing is processing of integrating electric charges (in the case of a charge-coupled device (CCD) sensor) obtained by performing photoelectric conversion in a certain set region of a group of light receiving elements such as 5×1 pixels or 4×2 pixels, for example, count values, or data values calculated based on count values. The integration processing includes averaging processing. By the binning processing, it is possible to increase sensitivity and perform analysis and sorting of plastics more accurately without decreasing substantively-required resolution, or while permissibly sacrificing resolution. Accordingly, at least in the dispersing direction of the spectroscopic element 133 (the row direction 135*r* in which wavelengths are developed on the imaging unit 135), the binning processing can be executed for the number of light receiving elements adapted to the substantively-required resolution.

Row Direction Binning Processing

Next, row direction binning processing to be executed by the intensification processing unit 170 according to the present exemplary embodiment will be described with reference to FIGS. 3A, 3B, 4A, and 4B. The intensification processing unit 170 performs column direction binning processing of integrating output signals of the light receiving elements 135*j* existing at different positions in the column direction of the imaging unit 135.

Figure 3A:
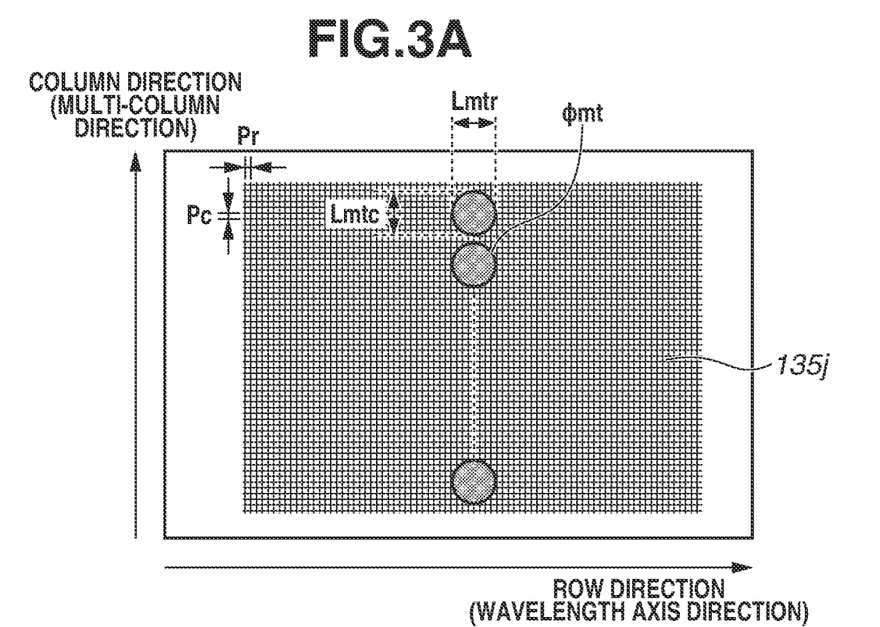
FIG. 3A is a diagram illustrating a relationship between a light receiving element of the imaging unit according to the first exemplary embodiment, and a monochromatic light projected image.
Figure 3B:
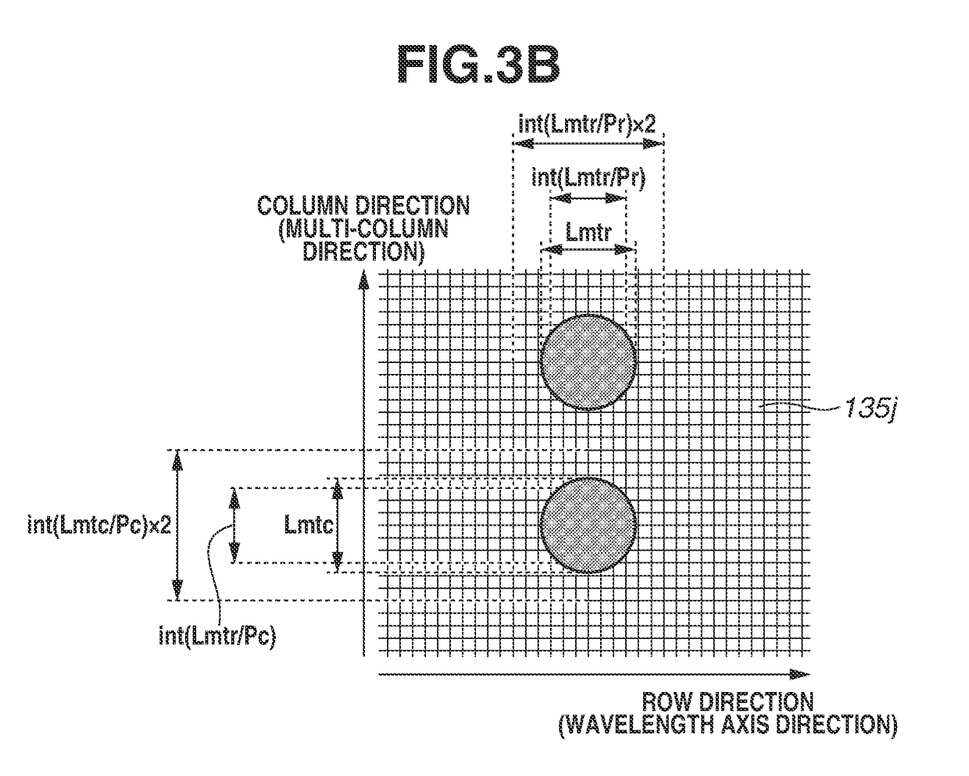
FIG. 3B is a diagram illustrating an operating condition of binning according to the first exemplary embodiment.

The number of pixels to be subjected to the row direction binning processing can be determined by optical simulation or actual measurement. In the simulation, from the spreading of a point image distribution function on the imaging unit 135 that is caused when monochromatic light having the same wavelength as a central wavelength of the spectroscopic element 133 is emitted from the light guiding unit 120*i*, the number of pixels can be defined by a size including an airy disk or a luminance value larger than or equal to a threshold value equivalent to the airy disk. In the actual measurement, the number of pixels can be defined based on the size of a point image on the imaging unit 135 that is formed when monochromatic light having the same wavelength as the central wavelength of the spectroscopic element 133 is emitted into an optical fiber of the light guiding unit 120*i*. FIGS. 3A and 3B each illustrate a projected image on the imaging unit 135 of a point image corresponding to monochromatic light. By calculating the size of the point image of the imaging unit 135 by the optical simulation or the actual measurement, the number of light receiving elements to be subjected to binning processing can be determined. The size of the point image can be actually measured using a knife-edge method.

The row direction binning processing includes processing of integrating output signals of the predetermined number of elements of light receiving elements adjacent in the row direction 135*r*. The predetermined number of elements can be set to a number larger than 1 if apodization is considered, but the number larger than or equal to 2 is employed from the aspect of an intensification effect.

As illustrated in FIG. 3A, the imaging unit 135 has an element pitch Pr in the row direction 135*r* and an element pitch Pc in the column direction 135*c* in the image capturing region 1351. On the other hand, a size $\Phi$mt of a projected image of monochromatic light that is projected onto the imaging unit 135 has a length Lmtr in the row direction 135*r* and a length Lmtc in the column direction 135*c* and does not lose generality. A rectangular grid region in the imaging unit 135 illustrated in FIGS. 3A and 3B each corresponds to the image capturing region 1351 in which the light receiving elements illustrated in FIG. 1C are arrayed.

As illustrated in FIG. 3B, a case is considered where a light receiving element pitch in the row direction 135*r* of the image capturing region 1351 is denoted by Pr, and the length in the row direction 135*r* of the size $\Phi$mt of the projected image of monochromatic light in a predetermined wavelength that is projected onto the imaging unit 135 when the light collection optical system 90*i* collects the monochromatic light is denoted by Lmtr. At this time, the number of light receiving elements to be subjected to row direction binning processing can be set to a number smaller than or equal to int(Lmtr/Pr)×2. In other words, int(Lmtr/Pr)×2 can be employed as an upper limit of the number of elements for the row direction binning processing, where F(x)=int(x) means an integer of a real number x. As the predetermined wavelength, a central wavelength of the spectroscopic element 133 or a certain wavelength including a central wavelength in a spectral wavelength region defined to be adapted to a target sample to be identified can be set. In other words, the predetermined wavelength is included in a wavelength range, light therein is projected onto the imaging unit 135 by the spectroscopic element 133.

Figure 4A:
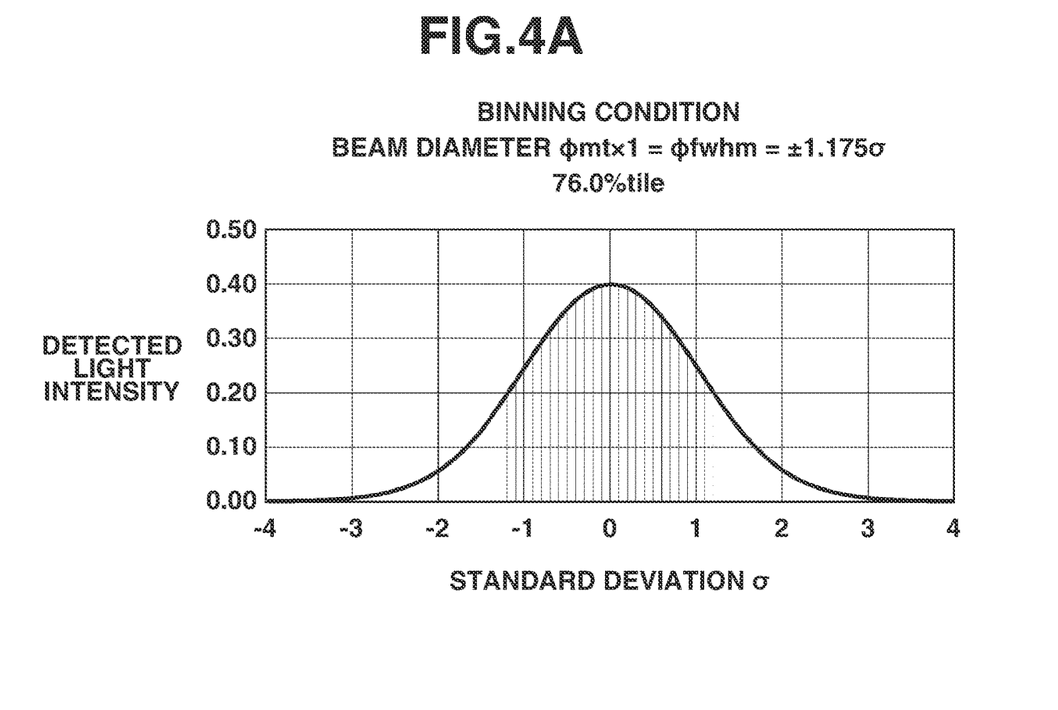
FIG. 4A is a diagram illustrating a relationship between a light amount distribution of a monochromatic light projected image and a beam diameter Φ according to the first exemplary embodiment.

Next, a beam diameter $\Phi$mt will be described with reference to FIG. 4A. A case is considered where the beam diameter $\Phi$ is regarded as a full width at half maximum (FWHM) in a beam profile of detected light intensity of a point image corresponding to monochromatic light. At this time, a FWHM of a wavelength of monochromatic light is set to be shorter than a wavelength width $\Delta\lambda$min of a spectral limit of the spectroscopic element 133.

At this time, in a case where the beam diameter Φmt is approximated by a normal distribution having a standard deviation σ=1 and a peak of detected light intensity at 0.40, a beam diameter corresponding to a FWHM corresponds to a standard deviation from −1.175σ to +1.175σ. Electric charges included in the beam diameter Φmt correspond to 76.0% of all of the detection signals corresponding to point images.

Figure 4B:
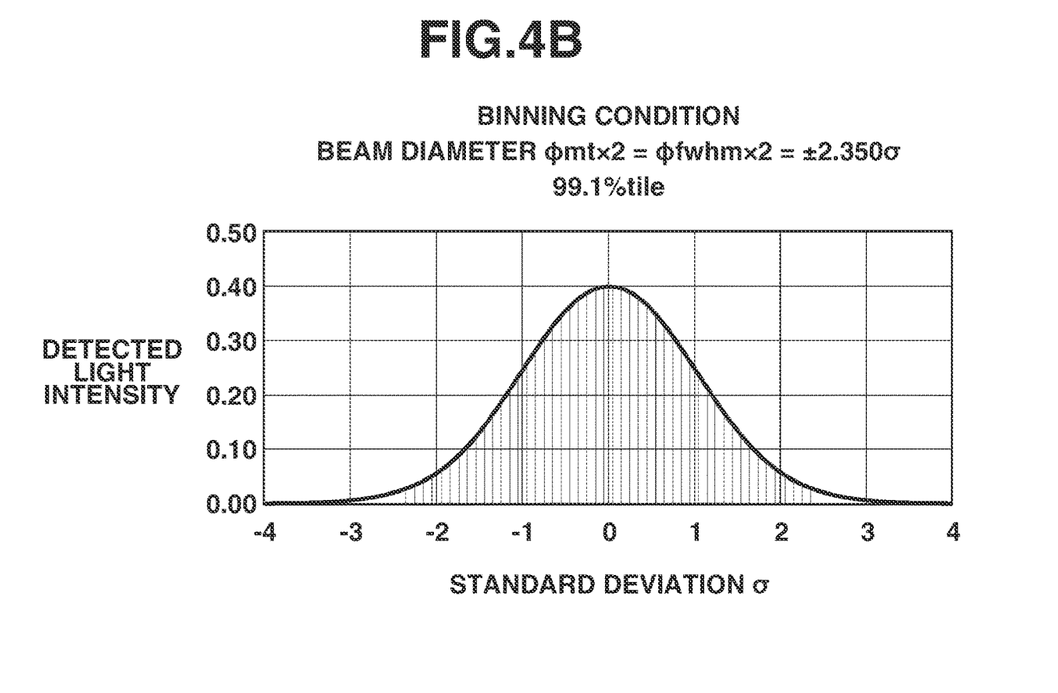
FIG. 4B is a diagram illustrating a relationship between the light amount distribution of the monochromatic light projected image and a beam diameter 2Φ according to the first exemplary embodiment.

Next, the beam diameter Φmt will be described with reference to FIG. 4B. A case is considered where the beam diameter Φ is regarded as a double width of the FWHM in a beam profile of detected light intensity of a point image corresponding to monochromatic light. At this time, a beam diameter corresponds to a standard deviation from −2.350σ to +2.350σ, and electric charges included in the beam diameter Φmt correspond to 91.1% of all of the detection signals corresponding to the point images.

The above-described upper limit of the number of elements for the row direction binning processing int(Lmtr/Pr)×2 means that, by regarding 91.1% of all of the detected electric charges of the detection signals corresponding to the point images of monochromatic light as the point images, signals from elements existing in the wavelength direction can be integrated as spectroscopically equivalent signals. The upper limit of the number of elements for the row direction binning processing will sometimes be referred to as a first upper limit of the number of elements for the binning processing.

On the other hand, in a case where a resolution in the wavelength direction is desired to be increased, as the upper limit of the number of elements for the row direction binning processing, a second upper limit of the number of elements for the binning processing int(Lmtr/Pr)×1 can be employed. In the second upper limit of the number of elements for the binning processing, as compared with the first upper limit of the number of elements for the binning processing, an upper limit of an intensification effect decreases to 0.760/0.911, but substantive overlap in the wavelength direction that is generated after the row direction binning processing is ignorable.

In other words, the acquisition unit 140 according to the present exemplary embodiment acquires spectroscopic information regarding one test substance of the plurality of test substances 190, based on a binning signal having been subjected to the row direction binning processing executed by the intensification processing unit 170.

Column Direction Binning Processing

The column direction binning processing includes processing of integrating output signals of the light receiving elements 135j corresponding to the predetermined number of rows adjacent in the column direction. The predetermined number of rows can be set to a number larger than 1 if apodization is considered, but a number larger than or equal to 2 is employed from the aspect of an intensification effect.

In the row direction 135r in which the light collection optical systems 90i are arranged over multiple columns, the light guiding units 120i are arranged in such a manner that the spectrum images 300i do not overlap each other so that crosstalk does not occur among spectrum images 300i corresponding to the plurality of light collection optical systems 90i.

In a case where a single mode fiber is used as the light guiding unit 120i, because a cladding diameter is large enough with respect to a core diameter, even if optical fibers are adjacently arranged at pitches of the cladding diameter, it is possible to reduce an influence caused by an overlap between spectrum images of an optical fiber array on an imaging unit. In a case where a multimode fiber is used as the light guiding unit 120i, a cladding diameter is slightly larger with respect to a core diameter in some cases. In such cases, an overlap between spectrum images may be generated depending on performance of the spectroscopic imaging unit 130. Thus, to avoid the generation of the overlap between spectrum images, it is desirable to separate optical fibers of the light guiding units 120i as appropriate so that the overlap between spectrum images is not generated on the imaging unit. The number of elements for binning processing in a multi-column direction of the light guiding unit 120i can be made smaller than a spreading range of a spectrum image corresponding to a wavelength resolution of the spectroscopic element. In other words, an multi-column arrangement used in the light guiding unit 120i and the light collection optical system 90i may be referred to as a coupling or one-dimensional array arrangement. In a case where an overlap between adjacent spectrum images is generated, the binning processing may be performed in such a manner as not to include pixel columns in a corresponding row direction. In the binning processing, apodization may be performed in which weighting is applied to each pixel position in the column direction 135c (for each row in the sub scanning direction) and integration thereof is performed. By applying a low weight to a light receiving element close to the adjacent spectrum images, it is possible to reduce crosstalk between adjacent spectrum images.

Similarly to the row direction binning processing, the column direction binning processing will be described below using a general expression. A light receiving element pitch in the column direction 135c of the image capturing region 1351 is denoted by Pc, and the length in the column direction 135c of the size Φmt of the projected image of monochromatic light in a predetermined wavelength that is projected onto the imaging unit 135 when the light collection optical system 90i collects the monochromatic light is denoted by Lmtc. To reduce crosstalk between adjacent projected spectrums, the predetermined number of rows corresponding to the first upper limit of the number of elements for the column direction binning processing is int(Lmtc/Pc)×2.

To further reduce crosstalk between adjacent projected spectrums, the predetermined number of rows corresponding to the upper limit of the number of elements for the column direction binning processing is desirably set to int(Lmtc/Pc).

The row direction binning processing includes apodization processing of applying a predetermined weight to output signals corresponding to a plurality of light receiving elements, and processing of integrating output signals having been subjected to the apodization processing.

The intensification processing unit 170 performs saturation determination of the light receiving elements 135j, and performs the row direction binning processing based on a determination result of the saturation determination. In the present exemplary embodiment, the number of elements for the binning processing in a wavelength axis direction in FIGS. 3A and 3B is uniformly set irrespective of a projected position on a projected spectrum. Nevertheless, another exemplary embodiment in which a region in which the number of elements for the binning processing in the wavelength axis direction varies depending on the projected position on the projected spectrum is included in a projected spectrum can also be employed. In other words, another exemplary embodiment in which the number of elements for the binning processing in the wavelength axis direction varies depending on the projected position on the projected spectrum can also be employed. In other words, another exemplary embodiment described above is a configuration in which a region in which the number of elements for the binning processing in the wavelength axis direction varies depending on a spectral wavelength on a projected spectrum is included in a projected spectrum. In other words, another exemplary embodiment in which the number of elements for the binning processing in the wavelength axis direction varies depending on a spectral wavelength on a projected spectrum can be employed.

Figure 5A:
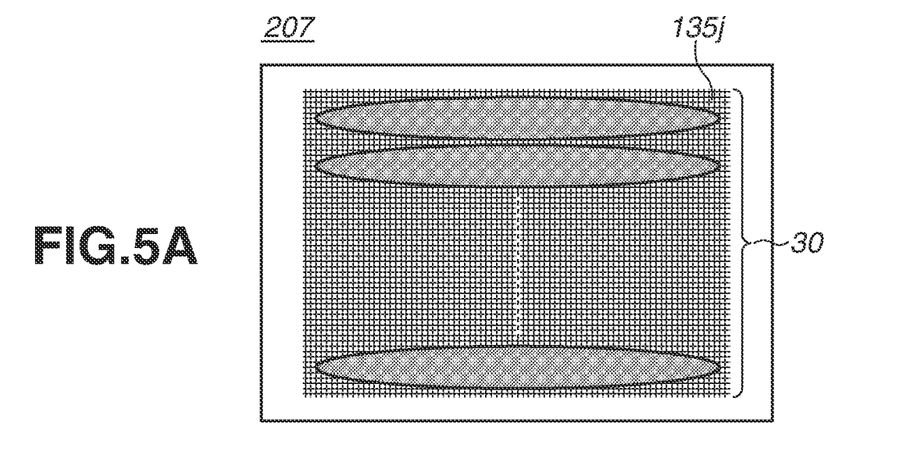
FIG. 5A is a diagram illustrating an example of an imaging unit projected image according to a second exemplary embodiment.
Figure 5B:
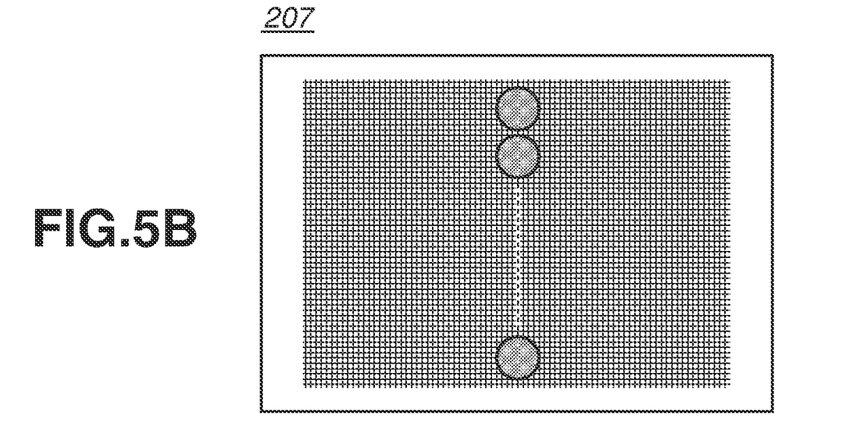
FIG. 5B is a diagram illustrating an example of an imaging unit projected image according to a second exemplary embodiment.
Figure 5C:
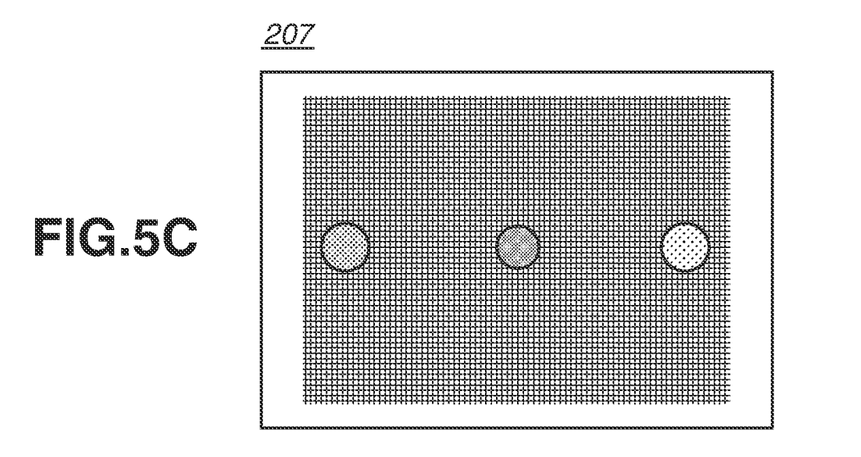
FIG. 5C is a diagram illustrating an example of an imaging unit projected image according to a second exemplary embodiment.

Because the influence of aberration becomes large in a peripheral portion of the imaging unit 135 depending on the performance of the spectroscopic imaging unit 130, the number of elements for the binning processing needs not be uniformly set on the imaging unit 135. FIG. 5C illustrates a conceptual diagram of a point image formed in a case where aberration occurs. Because an image sometimes becomes unclear in the peripheral portion (a region close to a projection end in the row direction or the wavelength direction) of the imaging unit 135, the number of elements for the binning processing in the peripheral portion may be increased to a number larger than the number thereof in a central portion of the imaging unit 135.

FIG. 1A illustrates an example of the sorting unit that uses the Raman scattering spectroscopy, but the sorting unit may perform analysis using the infrared spectroscopy. In that case, a configuration such as the configuration of a light collection optical system or a spectroscopic element is to be appropriately changed. The configuration of the spectroscopic element illustrated in FIGS. 1B and 2 may be appropriately changed to a method that uses a concave reflecting mirror or a prism.

A configuration of setting the number of light receiving elements to be subjected to the binning processing can be employed based on at least any of information regarding the properties of a test substance and information regarding material candidates to be identified by an acquisition unit. At least any one of the information regarding the properties of a test substance and the information regarding material candidates can be used as prior information before the time at which the light collection optical system 90 collects light. In other words, at least any one of the information regarding the properties of a test substance and the information regarding material candidates can be used as prior information before the time at which the spectroscopic imaging unit 130 performs image capturing.

For example, in a case where the identification apparatus is used to identify waste plastics, in actuality, properties such as a type, a component ratio, a shape, and a grain diameter of input plastics are roughly identified, or even if the input plastics contain plastic of an unidentified type, types of plastic that are valuable are limited, and plastics desired to be reclaimed are identified.

Furthermore, it is possible to adaptively select a spectral sensitivity or a spectral resolution corresponding to spectrum intensity that is to be prioritized based on the prior information. For example, in a case where the spectral sensitivity is prioritized, it is possible to adaptively set the number of elements for the binning processing in the wavelength direction to a number higher than int(Lmtr/Pr). Similarly, in a case where the spectral resolution is prioritized, it is possible to adaptively set the number of elements for the binning processing in the wavelength direction to a number lower than or equal to int(Lmtr/Pr). The information regarding properties of a test substance includes prior information associated with the test substance in advance, and color information acquired by an imaging unit of a hyperspectral camera or the like.

The information regarding properties of a test substance that serves as the prior information includes at least any of information regarding spectral reflectance in a visible light range of the test substance, information regarding the height of the test substance, and information regarding surface roughness of the test substance.

With the identification apparatus according to the present exemplary embodiment, by collectively measuring information regarding a plurality of light collection optical systems using one spectroscopic element and executing binning processing at required resolution, it is possible to provide a high-sensitive analysis apparatus or sorting unit while providing the identification apparatus configured to be in a compact size at low cost.

Next, row direction binning processing according to a second exemplary embodiment will be described. In the second exemplary embodiment, the processing is performed after the intensification processing unit 170 determines whether saturation has occurred in each pixel. Because a configuration of the apparatus is the same as that illustrated in FIGS. 1A to 1C, the description thereof will be omitted in the present exemplary embodiment, and the processing performed by the intensification processing unit 170 will be described.

Particularly in the Raman scattering spectroscopy, some test substances may emit intense fluorescence, and a signal may sometimes be saturated exceeding a dynamic range of a sensor. Depending on the degree of signal intensity, a situation may occur in which saturation occurs in part of each spectrum image of the spectrum images 300i of the light collection optical systems 90 and saturation does not occur in the remaining part thereof. In such a case, if the binning processing is performed in the same way as in the first exemplary embodiment, a quantitative property of pixel data having been subjected to the binning processing is lost. In view of the foregoing, in the present exemplary embodiment, by performing saturation determination for each line in a dispersing direction before the binning processing and excluding a line including a saturated pixel from a binning processing target, it is possible to acquire Raman spectrum data while avoiding the influence of saturation. In the binning processing to be performed in this case, because the number of pixels on which the binning processing is to be performed substantively varies in each binning pixel region, averaging is performed instead of integration.

In a case where saturation of a specific pixel is identified, the presence or absence of a saturated pixel may be displayed as output information of the intensification processing unit 170. With this configuration, a user can explicitly recognize a position on a spectrum or a pixel on the imaging unit 135 at which saturation occurs. In this case, the user may be enabled to set a binning exclusion region and may be enabled to change the setting on the intensification processing unit 170 to reflect the setting change in analysis or sorting to be performed next time or later. In a case where a user can explicitly recognize information regarding a saturated pixel, the binning processing may be executed with the saturated pixel being included.

According to the present exemplary embodiment, by performing the saturation determination and then performing the binning processing based on a result of the saturation determination, even in a case where saturation occurs, analysis and sorting can be performed without significantly reducing measuring accuracy.

The disclosure is not limited to the above-described exemplary embodiments, and various changes and modifications can be made without departing from the spirit and scope of the disclosure. The following claims are therefore appended for setting forth the scope of the aspect of the embodiments.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An identification apparatus comprising:
   a plurality of light collection optical systems configured to collect scattered light from a plurality of test substances;
   a spectroscopic element configured to disperse a plurality of light beams from the plurality of light collection optical systems;
   an imaging unit including a plurality of light receiving elements arrayed in a row direction and a column direction, and configured to receive a plurality of dispersion spectra projected from the spectroscopic element and projected in the row direction;
   an acquisition unit configured to acquire spectroscopic information of at least any of the plurality of test substances based on an output signal from the imaging unit; and
   an intensification processing unit configured to perform row direction binning processing including integrating output signals of the plurality of light receiving elements existing at different positions in the row direction,
   wherein the acquisition unit includes the intensification processing unit.

2. The identification apparatus according to claim 1, wherein the row direction binning processing includes processing of integrating output signals in association with a predetermined number of the light receiving elements adjacent in the row direction.

3. The identification apparatus according to claim 2, wherein the predetermined number of the elements is larger than or equal to 2.

4. The identification apparatus according to claim 2, wherein, where an element pitch in the row direction of the light receiving elements is denoted by Pr and a length in a row direction of a size $\Phi mt$ of a projected image of monochromatic light in a predetermined wavelength that is projected onto the imaging unit when each light collection optical system collects the monochromatic light is denoted by Lmtr, the predetermined number of the elements is smaller than or equal to int (Lmtr/Pr)×2, and
   wherein $F(x)=int(x)$ means an integer of a real number x.

5. The identification apparatus according to claim 4, wherein the predetermined number of the elements is smaller than or equal to int (Lmtr/Pr).

6. The identification apparatus according to claim 2, wherein the predetermined number of the elements varies depending on a spectral wavelength on the dispersed spectrum image.

7. The identification apparatus according to claim 2, wherein the predetermined number of the elements is set based on information regarding a property of a test substance or information regarding a material candidate to be identified by the acquisition unit.

8. The identification apparatus according to claim 7, wherein the information regarding the property of the test substance includes at least any of information regarding spectral reflectance in a visible light range of the test substance, information regarding a height of the test substance, and information regarding surface roughness of the test substance.

9. The identification apparatus according to claim 7, wherein at least any one of the information regarding the property of the test substance and the information regarding the material candidate includes prior information to be acquired before a time at which the light collection optical system collects light.

10. An identification apparatus comprising:
    a plurality of light collection optical systems configured to collect scattered light from a plurality of test substances;
    a spectroscopic element configured to disperse a plurality of light beams from the plurality of light collection optical systems;
    an imaging unit including a plurality of light receiving elements arrayed in a row direction and a column direction, and configured to receive a plurality of dispersion spectra projected from the spectroscopic element and projected in the row direction;
    an acquisition unit configured to acquire spectroscopic information of at least any of the plurality of test substances based on an output signal from the imaging unit; and
    an intensification processing unit configured to perform row direction binning processing including integrating output signals of the plurality of light receiving elements existing at different positions in the row direction,
    wherein the imaging unit includes the intensification processing unit.

11. The identification apparatus according to claim 1, wherein the acquisition unit acquires spectroscopic information regarding one of the plurality of test substances based on a binning signal having been subjected to the row direction binning processing.

12. The identification apparatus according to claim 1, wherein the intensification processing unit performs column direction binning processing including integrating output signals of the light receiving elements existing at different positions in the column direction of the imaging unit.

13. The identification apparatus according to claim 12, wherein the column direction binning processing includes processing of integrating output signals of the light receiving elements in association with a predetermined number of rows adjacent in the column direction.

14. The identification apparatus according to claim 13, wherein the predetermined number of rows is larger than or equal to 2.

15. The identification apparatus according to claim 13,
    wherein, where an element pitch in the column direction of the light receiving elements is denoted by Pc and a length in a column direction of a size $\Phi mt$ of a projected image of monochromatic light in a predetermined wavelength that is projected onto the imaging unit when each light collection optical system collects the monochromatic light is denoted by Lmtc, the predetermined number of the rows is smaller than or equal to int (Lmtc/Pc)×2, and
    wherein $F(x)=int(x)$ means an integer of a real number x.

16. The identification apparatus according to claim 15, wherein the predetermined number of rows is smaller than or equal to int(Lmtc/Pc).

17. The identification apparatus according to claim 1, wherein the light collection optical systems collect Raman-scattered light from the test substances.

18. The identification apparatus according to claim 17,
wherein the light collection optical system includes an effective light collection region,
wherein, in the effective light collection region, the light collection optical system further includes a placement unit on which the test substance is placed, and
wherein the placement unit includes a mechanism configured to move the test substance placed in the effective light collection region to an outside of the effective light collection region.

19. The identification apparatus according to claim 18, wherein the placement unit is configured to move the plurality of test substances in a predetermined direction.

20. The identification apparatus according to claim 10, wherein the row direction binning processing includes processing of integrating output signals in association with a predetermined number of the light receiving elements adjacent in the row direction.

21. The identification apparatus according to claim 20, wherein the predetermined number of the elements is larger than or equal to 2.

22. The identification apparatus according to claim 20,
wherein, where an element pitch in the row direction of the light receiving elements is denoted by Pr and a length in a row direction of a size $\Phi$mt of a projected image of monochromatic light in a predetermined wavelength that is projected onto the imaging unit when each light collection optical system collects the monochromatic light is denoted by Lmtr, the predetermined number of the elements is smaller than or equal to int(Lmtr/Pr)×2, and
wherein F(x)=int(x) means an integer of a real number x.

23. The identification apparatus according to claim 22, wherein the predetermined number of the elements is smaller than or equal to int(Lmtr/Pr).

24. An identification apparatus comprising:
a plurality of light collection optical systems configured to collect scattered light from a plurality of test substances;
a spectroscopic element configured to disperse a plurality of light beams from the plurality of light collection optical systems;
an imaging unit including a plurality of light receiving elements arrayed in a row direction and a column direction, and configured to receive a plurality of dispersion spectra projected from the spectroscopic element and projected in the row direction;
an acquisition unit configured to acquire spectroscopic information of at least any of the plurality of test substances based on an output signal from the imaging unit; and
an intensification processing unit configured to perform row direction binning processing including integrating output signals of the plurality of light receiving elements existing at different positions in the row direction,
wherein the intensification processing unit performs column direction binning processing including integrating output signals of the light receiving elements existing at different positions in the column direction of the imaging unit.

25. The identification apparatus according to claim 24, wherein the column direction binning processing includes processing of integrating output signals of the light receiving elements in association with a predetermined number of rows adjacent in the column direction.

26. The identification apparatus according to claim 25, wherein the predetermined number of rows is larger than or equal to 2.

27. The identification apparatus according to claim 25,
wherein, where an element pitch in the column direction of the light receiving elements is denoted by Pc and a length in a column direction of a size $\Phi$mt of a projected image of monochromatic light in a predetermined wavelength that is projected onto the imaging unit when each light collection optical system collects the monochromatic light is denoted by Lmtc, the predetermined number of the rows is smaller than or equal to int(Lmtc/Pc)×2, and
wherein F(x)=int(x) means an integer of a real number x.

28. The identification apparatus according to claim 27, wherein the predetermined number of rows is smaller than or equal to int(Lmtc/Pc).

* * * * *